US009173139B2

(12) United States Patent
Lim et al.

(10) Patent No.: US 9,173,139 B2
(45) Date of Patent: Oct. 27, 2015

(54) METHOD AND TERMINAL FOR QUICKLY SEARCHING FOR AN ACCESS POINT

(75) Inventors: Jae Won Lim, Gyeongki-do (KR); Byoung Hoon Kim, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 13/877,494

(22) PCT Filed: Jan. 21, 2011

(86) PCT No.: PCT/KR2011/000454
§ 371 (c)(1),
(2), (4) Date: Apr. 3, 2013

(87) PCT Pub. No.: WO2012/046925
PCT Pub. Date: Apr. 12, 2012

(65) Prior Publication Data
US 2013/0208700 A1 Aug. 15, 2013

Related U.S. Application Data

(60) Provisional application No. 61/390,619, filed on Oct. 7, 2010.

(51) Int. Cl.
*H04W 48/16* (2009.01)
*H04W 36/00* (2009.01)
*H04W 36/14* (2009.01)
*H04W 88/06* (2009.01)

(52) U.S. Cl.
CPC .......... *H04W 36/0061* (2013.01); *H04W 36/14* (2013.01); *H04W 48/16* (2013.01); *H04W 88/06* (2013.01)

(58) Field of Classification Search
CPC .................................................... H04W 52/02

USPC .................................. 370/328, 331, 332, 311
See application file for complete search history.

(56) References Cited

U.S. PATENT DOCUMENTS

2004/0176024 A1 9/2004 Hsu et al.
2006/0035636 A1* 2/2006 Pirila .......................... 455/435.2
(Continued)

FOREIGN PATENT DOCUMENTS

KR 10-2010-0002044 A 1/2010
KR 10-2010-0067021 A 6/2010

OTHER PUBLICATIONS

International Search Report issued in corresponding International Patent Application No. PCT/KR2011/000454 dated Oct. 27, 2011.

*Primary Examiner* — Pao Sinkantarakorn
*Assistant Examiner* — Stephen Steiner
(74) *Attorney, Agent, or Firm* — Morgan, Lewis & Bockius LLP

(57) ABSTRACT

Provided are a terminal and a method for searching access points performed by a terminal supporting a multi-RAT (Radio Access Technology) in a wireless communication system. The method includes: receiving, by the terminal, information on one or more access points (APs) located within a cell coverage of a base station; determining whether there are any accessible APs within the cell coverage of the base station based on the received information; searching and selecting an AP according to the determining, wherein: if there are accessible APs, the terminal searches and selects the AP within a first time period, the first time period is shorter than a current time period for searching the AP, if there are no accessible APs, the terminal searches and selects the AP within a second time period, and the second time period is longer than the current time period for searching the AP; and accessing the selected AP.

8 Claims, 5 Drawing Sheets

(56) References Cited

U.S. PATENT DOCUMENTS

| | | | |
|---|---|---|---|
| 2006/0099948 A1* | 5/2006 | Hoghooghi et al. | 455/436 |
| 2009/0247170 A1 | 10/2009 | Balasubramanian et al. | |
| 2010/0157864 A1* | 6/2010 | Salomone et al. | 370/311 |
| 2010/0195595 A1* | 8/2010 | Iwata | 370/329 |
| 2011/0105129 A1 | 5/2011 | Kim et al. | |
| 2011/0211511 A1* | 9/2011 | Bakthavathsalu et al. | 370/311 |
| 2011/0243108 A1 | 10/2011 | Park et al. | |

* cited by examiner

METHOD AND TERMINAL FOR QUICKLY SEARCHING FOR AN ACCESS POINT

TECHNICAL FIELD

The present invention relates to a method of searching an access point.

BACKGROUND ART

Second generation mobile communication, including CDMA and GSM, means transmission and reception of voice through digital data. As an advance from the GSM, GPRS has been proposed, which is a technology for providing a packet switched data service based on the GSM system.

Third generation mobile communication means communication of image and data as well as voice, and 3GPP (Third Generation Partnership Project) developed mobile communication system (IMT-2000) technology and adopted WCDMA as the Radio Access Technology (RAT). The IMT-2000 technology and Radio Access Technology (RAT), i.e. WCDMA, are comprehensively referred to as UMTS (Universal Mobile Telecommunication System) in Europe. And, UTRAN stands for UMTS Terrestrial Radio Access Network.

Now the Third generation mobile communication is evolving into Fourth generation mobile communication.

As a Fourth generation mobile communication technology, two methods have been proposed, one being Long-Term Evolution Network (LTE) technology which has been under development for standardization by 3GPP and another being IEEE 802.16 which has been under development for standardization by IEEE. For LTE, the term E-UTRAN (Evolved-UTRAN) is being used.

In the Fourth generation mobile communication technology, OFDM (Orthogonal Frequency Division Multiplexing)/OFDMA (Orthogonal Frequency Division Multiple Access) has been introduced. OFDM uses multiple orthogonal subcarriers. OFDM uses orthogonality characteristics between IFFT (inverse fast Fourier Transform) and FFT (fast Fourier Transform). The transmitter transmits data by performing data IFFT to the data. The receiver restores original data by performing FFT to the data received. The transmitter uses IFFT for combining multiple subcarriers and the receiver uses corresponding FFT for separating the multiple subcarrier.

Meanwhile, many efforts are being made in Third or Fourth generation mobile communication system to increase the capacities of cells to support high bandwidths and bidirectional services such as multimedia contents and streaming.

Also, there have been approaches to use higher frequency bandwidths for increasing cell capacities and reduce cell radii. By using cells with small radius such as pico cell, it is possible to use higher bandwidth than the frequencies used in conventional cellular system, thereby providing the merit of transmitting more information. These method, however, have disadvantage of more cost for installing more base stations in the same area.

In the efforts to increase the capacities of cells, the methods of using femtocell have been proposed recently.

Femtocell means providing small scale wireless environment by installing compact base stations which consume low power at indoor space of home or office. The femtocell can enhance the quality of service by extending the area where the service is available and improving the capacities of the service, and is expected to stabilize next generation mobile communication system by providing data service.

Meanwhile, recent communication terminal devices are generally equipped with Wi-Fi module or Bluetooth. Especially, as smart phones are widely used, it is common that various heterogeneous radio access technologies such as cellular (Third generation or Fourth generation communication) access technology, WLAN, Bluetooth and ZigBee are equipped in a handset. These types of devices equipped with various heterogeneous radio access technologies in a handset is called dual mode handsets.

As the dual mode handsets described above is widely used, the technology of FMC (Fixed Mobile Convergence) is newly being proposed.

According to the FMC technology, when the user with a handset of the technology approaches a UMA (Unlicensed Mobile Access) based Access Point (or wireless base station), the service identical with the Third generation or Fourth generation communication technology is provided by using unlicensed wireless frequencies.

FIG. 1 illustrates the technology of FMC.

As can be seen by referring to FIG. 1, terminal 10 and access point 20 are within the coverage of the base station 30. The access point 20 can use Wireless LAN or Bluetooth which are based on Wi-Fi.

When the terminal 10, which is under communication with the base station 30, enters the coverage of the access point 10 using Wi-Fi or Bluetooth, the base station 30 performs a handover to the access point 20 so that the communication can be performed seamlessly.

Recently, various methods are being developed including the method of communication in which a user can communicate by using femto base station, Third generation or Fourth generation cellular communication technology at personal space such as home or office by combining the FMC communication method and femto base station method, and also can communicate, as needed, by using unlicensed bands such as Wi-Fi.

In order to use the FMC technology, the terminal should search for neighboring access points. Periodic search of access points, however, requires much power consumption and the resources of the terminal are also consumed, thereby affecting the cellular mobile communication under current connection.

DISCLOSURE

Technical Problem

Therefore, the embodiments of the present invention have the objective of solving the problems described above. More specifically, the embodiments of the present invention have the objective of providing a method for effectively searching access points.

Means to Solve the Problem

In order to achieve the objective described above, the embodiments of the present invention provide a method for searching access points in a handset supporting multiple radio access method. The method for searching access points can comprise the steps of receiving information on access points of a second radio access method from a base station of a first radio access method; determining whether there exist one or more access points of the second radio access method in the cell coverage of said base station based on said information; searching access points that can be accessed with shorter period of access than normal period when there exist one or more access points of the second radio access method; and accessing to the access point of the second radio access method.

The method of search can further comprise the step of searching access points with longer period than normal search period when access point of second radio access method is determined to be absent within the cell coverage of said base station.

The method of search can further comprise the step of running a timer when access point of second radio access method is determined to be absent within the cell coverage of the base station.

The method of search can increment the search period of the terminal by predetermined time value ($\alpha$) upon expiration of the timer, and perform searching of access points with incremented period. Every time the timer is expired, the period of search is incremented by predetermined time value. At this step, the step of searching the access point is repeated until the incremented period reaches a certain period value (Pmax).

The method of search can further comprise the step of stopping the search when the period of searching the access point is longer than specific period value, Pmax. At this step, the stopping of the search can be maintained until cell reselection to other cell or handover to other cell is performed.

The method of search can further comprise the step of determining whether the throughput of the access points of a second radio access method discovered is higher than predetermined value. At this step, the step of accessing to the access point can be performed only when the value of throughput is higher than predetermined value.

The step of determining whether the throughput of the access points of a second radio access method discovered is higher than predetermined value can comprise one or more of the steps of determining whether the access points of a second radio access method discovered ensures predetermined QoS; and determining whether the throughput of the access points of a second radio access method discovered is higher than predetermined value.

The step of determining can comprise the steps of determining whether one or more access points of the second radio access method exist within the cell coverage of said base station based on said information, and, when the access point exists, determining whether the throughput of said access point is higher than predetermined value. The step of searching the access points with shorter period can be performed only when the throughput of said access point is higher than predetermined value.

In addition, in order to achieve the objective of the invention described above, one embodiment of the present invention provides a terminal device supporting multiple radio access method.

The terminal device can comprise a receiving unit which receives information on access points of a second radio access method from a base station of a first radio access method; and a processor which determines whether there exist one or more access points of the second radio access method in the cell coverage of said base station based on said information, searches access points that can be accessed with shorter period of access than normal period when there exist one or more access points of the second radio access method; and accesses to the access point of the second radio access method.

The processor can search access points with longer period than normal search period when access point of second radio access method is determined to be absent within the cell coverage of said base station.

When access point of second radio access method is determined to be absent within the cell coverage of said base station, the processor can run a timer and searches access points with said longer period until said timer expires.

The method of search can increment the search period of the terminal by predetermined time value ($\alpha$) upon expiration of the timer, and perform searching of access points periodically with incremented period. Then Tx timer is reset to 0 again, and every time the timer is expired, the period of search is incremented by predetermined time value. At this step, the step of searching the access point is repeated until the incremented period reaches a certain period value (Pmax).

The processor can stop the search when the period of searching the access point is longer than specific period value, Pmax, and the stopping of the search can be maintained until cell reselection to other cell or handover to other cell is performed.

The processor can determine whether the throughput of the access points of a second radio access method discovered is higher than predetermined value, and perform access to the access point when said value of throughput is higher than predetermined value.

The processor, in order to determine whether the throughput of the access points of a second radio access method discovered is higher than predetermined value, determines whether the access points of a second radio access method discovered ensures predetermined QoS; and determines whether the throughput of the access points of a second radio access method discovered is higher than predetermined value.

Advantageous Effects

According to one embodiment of the present invention, the terminal can search the access points more efficiently. Therefore the terminal can effectively access the access point discovered.

According to another embodiment of the present invention, consumption of power and resources of the terminal can be reduced.

MODES FOR CARRYING OUT THE INVENTION

Figure 1:
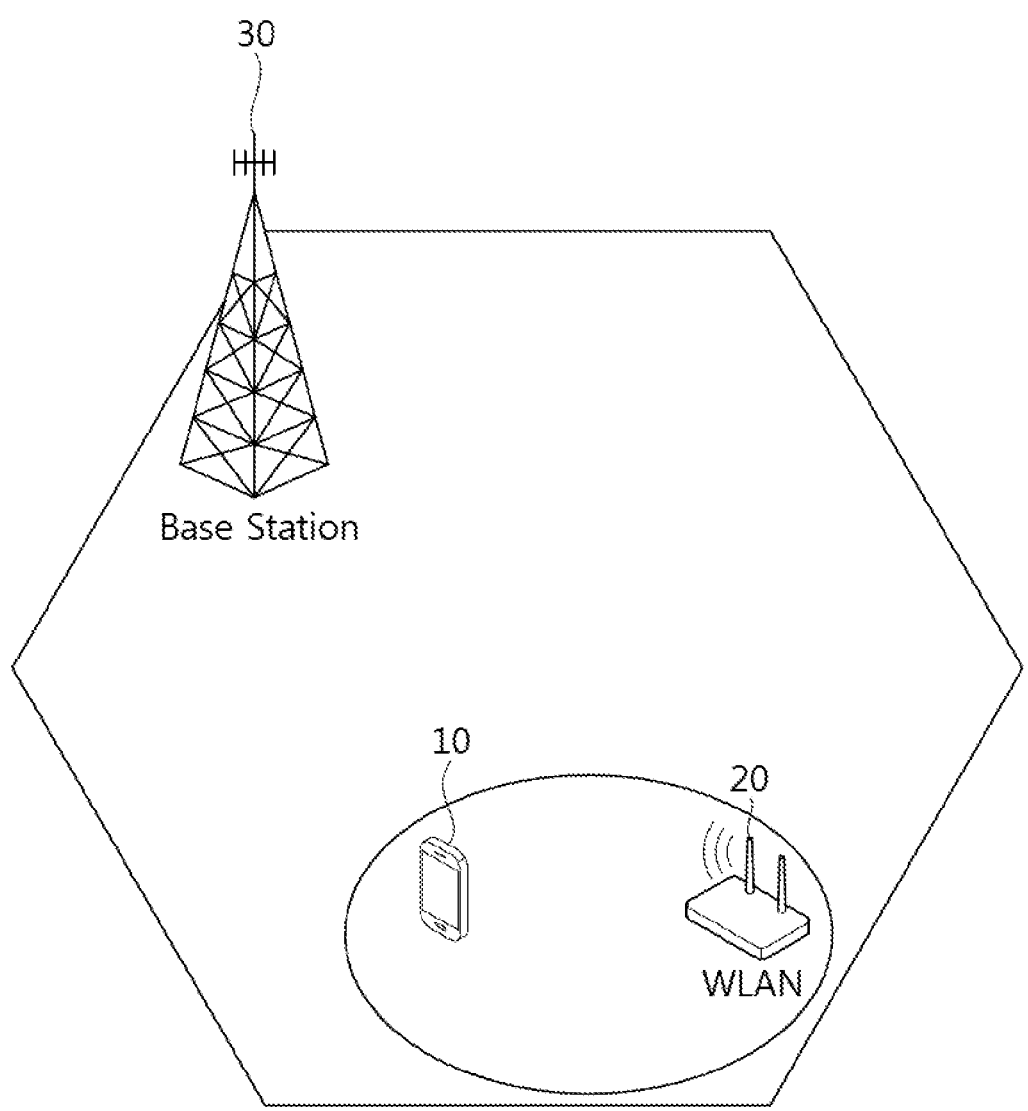
FIG. 1 illustrates one example of FMC technology.

The present invention can be applied to wireless LAN and cellular mobile communication. The present invention, however, is not limited to said fields and con be applied to any communication technologies to which the technical idea of the present invention can be applied.

Technical terms used in the specification are for describing specific examples of the present invention and should not be interpreted to limit the present invention. Also, the technical terms used in the specification, unless explicitly defined as other meanings in the specification, should be interpreted to mean the general understanding by those skilled in the art to which the present invention pertains, and should not be interpreted excessively comprehensively nor in excessively limited meanings. Also when the technical terms used in the specification the present invention happen to fail to represent the technical idea of the present invention, the terms should be interpreted by replacing the terms with the terms that can be correctly understood by those skilled in the art. Also the general terms used in the specification should be interpreted as defined in the dictionary considering context of the statements and should not be interpreted with excessively reduced meaning.

Also the singular expressions used in the specification include plural expressions unless explicitly stated otherwise. The terms "comprise" or "include" in the specification should not be interpreted to always include all the constructing components or steps, and some components or steps can be excluded and additional components or steps can be added.

Also the ordinal numbers used in the specification such as "first" or "second" can be used to describe various constructing components of the invention and are not meant to limit the constructing components. The terms should be interpreted to distinguish one component from others, For example, the first constructing component can be named as the second constructing component and similarly the second constructing component can be named as the first constructing component without deviating from the scope of the present invention.

When the expression "associated" or "accessed" is used in the specification to express the association of constructing components, said components can be directly associated or accessed each other or other constructing component can exist in between. On the other hand, when a component is said to be "directly associated" or "directly accessed" to other components, it should be understood that no intervening component exists in between.

Preferred embodiments of the present invention will be described below with reference to the drawings attached, in which identical reference numerals are given to the identical or similar constructing components regardless of the drawing numbers and duplicate explanations are omitted. Also, in describing the present invention, publicly known technologies related to the present invention are not described when specific description of known technology is deemed to distract the core features of the present invention. Also, it should be noted that the drawings attached are for the purpose of explaining the technical idea of the present invention and are not meant to limit the present invention by the drawings. The technical idea of the present invention should be interpreted to be extended to all modifications, equivalents, or substitutes, in addition to the drawings attached.

As for the term "terminal" used below, the "terminal" can be referred to as UE (User Equipment), ME (Mobile Equipment), MS (Mobile Station), UT (User Terminal), SS (Subscriber Station), MSS (Mobile Subscriber Station), wireless device, handheld device or AT (Access Terminal). Also the "terminal" can be mobile devices with communication function that can be carried such as mobile handset, PDA, smart phone, wireless modem or laptop, or fixed devices such as PC or equipments mounted on vehicles.

Figure 2:
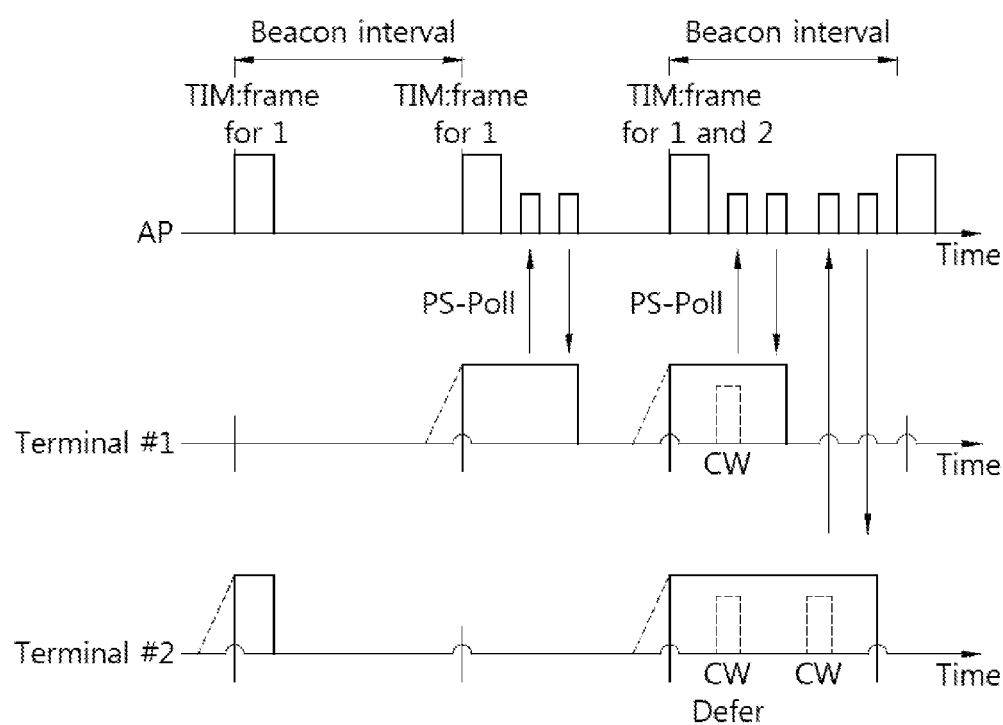
FIG. 2 illustrates the operation of power consumption in general terminals.

FIG. 2 illustrates the operation for power consumption of general terminals.

Referring to FIG. 2, terminal #1 and terminal #2 are shown assuming to be connected (or associated) to an access point (AP). In this state of connection, the terminal #1 and terminal #2 repeat sleep mode and idle mode with their own periods, as shown in FIG. 2.

First, describing the operation of the access point, the access points have queues that can store packets received during sleep mode from connected terminals. The access points periodically broadcast beacon messages. Also, the access points broadcast TIM (Traffic Indication Map) at the start of transmission period of each beacon message. The TIM is used for indicating from which terminal the packet has been received during sleep mode. Also, the access points transmit, through contention among terminals, the packet stored in the queue when polling on the packet is received from a certain terminal.

Each terminal is associated to the access point, and transmits to and receives from the access point the information on sleep mode and the period of idle mode. When each terminal is in idle mode and receives the TIM at the start of transmission period of each beacon message, the terminal, if the TIM includes its ID, requests polling on the packet and receives the packet which has been stored in the queue through contention with other terminals.

The method has been described in the case when the terminal is associated to the access point.

When the terminal is not associated to the access point, however, the terminal should search access points in idle mode. However, the terminal cannot search neighboring access points due to low power consumption in sleep mode which is specified as about 20 mW in IEEE 802.11 standards. According to IEEE 802.11 standards, the terminal should search access points in idle mode which requires as high as 110 mW of power consumption.

Therefore, the method that the terminal can effectively search access points will be described below. Describing briefly to help understanding the invention, the terminal supports radio access technology and local area network radio access technology (e.g. Wi-Fi) based on Third or Fourth generation communication technology, and the terminal performs searching by receiving information on neighboring access points from base stations based on the Third or Fourth generation communication technology. Here, the local area network radio access technology is not limited to Wi-Fi but includes various local area network radio access technology such as Bluetooth.

More specifically, according to the present invention, the cellular base station to which the terminal has been connected transmits, for saving the power consumption required to search access points, information on the access points located within the coverage of the corresponding base station to the terminal. The information can include the information whether there exist any access points in the coverage that can be accessed by the terminal, the number of access points, the address of each access point (e.g., MAC address or SSID (Service Set ID)), the capability of each access point, and the value of throughput available.

Therefore, the base station can receive the information on the corresponding access points periodically from core networks. Alternatively, the base station can receive the information on the access points searched by other terminal in the same coverage, and build database based on the information received. At this step, said other terminal can transmit only the information on the access points which are searched within the coverage of the said base station to the base station.

Figure 3:
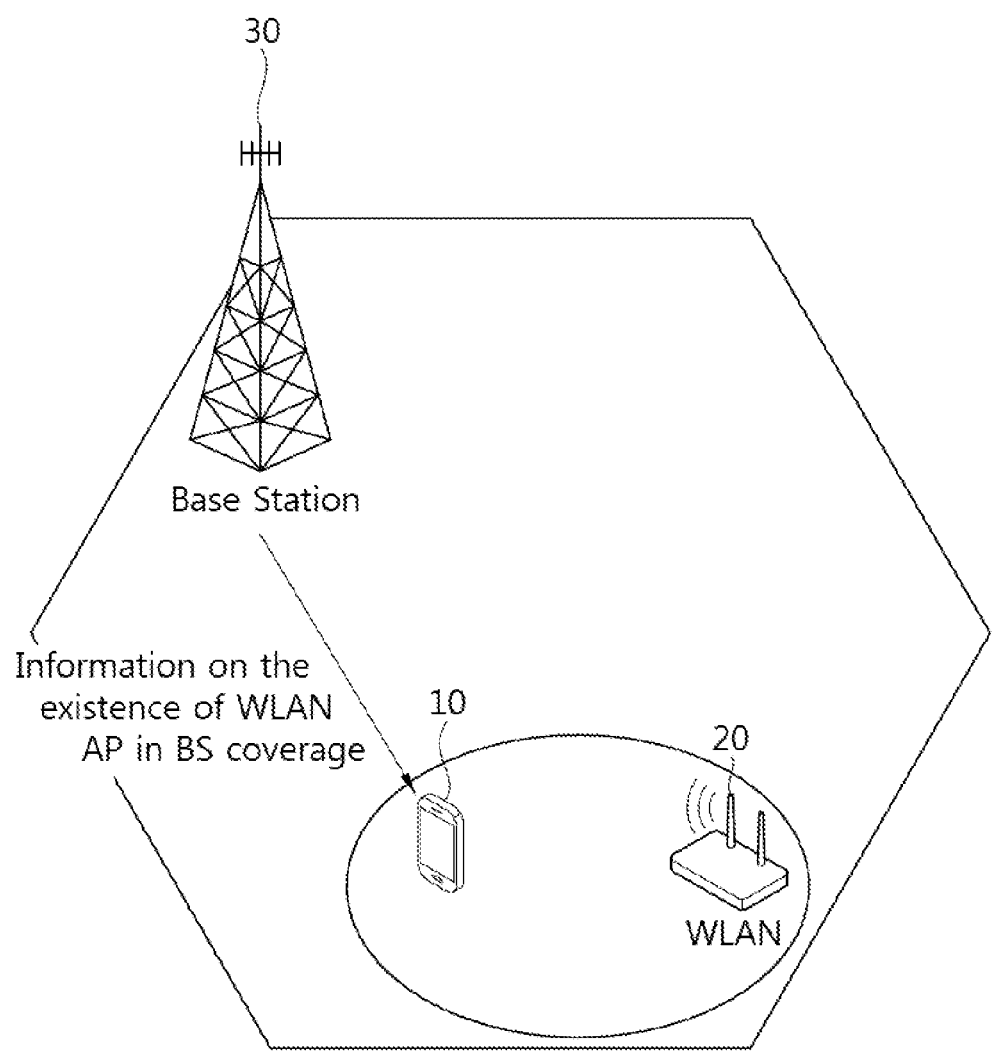
FIG. 3 illustrates the method according to one example of the present invention.

FIG. 3 illustrates the method according to one embodiment of the present invention.

As can be seen with reference to FIG. 3, terminal 100 and access point 200 are in the coverage of the base station 300. The access point 20 can use local area radio access method such as wireless LAN based on Wi-Fi or Bluetooth.

First, the base station 300 receives the information on the access points within its coverage from the core network. Alternatively, the base station 300 can receive the information on the access points searched by said multiple terminals within its coverage and build database based on the information received.

The base station 300 transmits said information to the multiple terminals within its coverage. The information can include the information whether there exists any access points in the coverage that can be accessed by the terminal, the number of access points, the address of each access point (e.g., MAC address or SSID (Service Set ID)), the capability of each access point, and the value of throughput available.

The terminal receiving the information can search the neighboring access points effectively by using the information received. This method will be described below with reference to FIG. 4.

Figure 4:
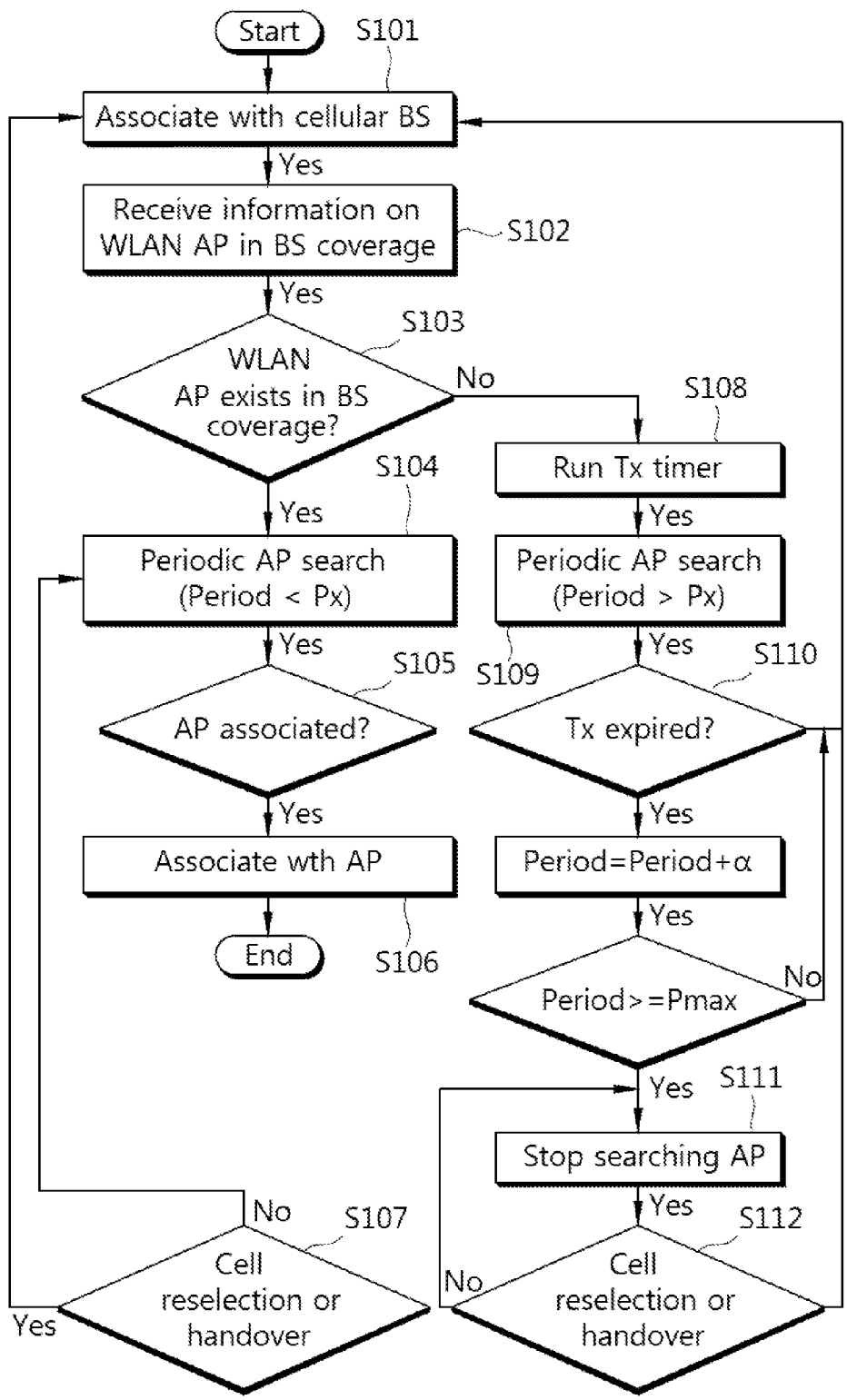
FIG. 4 illustrates the method according to another example of the present invention.

FIG. 4 illustrates the method according to one embodiment of the present invention.

First, the terminal 100 supporting multiple radio access methods is connected to the base station 300 (S101). At this step, the terminal 100 accesses the base station 300 as a base connection even when the terminal can access the access point (AP) for the reason such as supporting voice communication and ensuring stable QoS, and continuously performs the process of synchronization with the base station of cellular mobile communication.

The terminal 100 receives the information on one or more access points (APs) located within the cell coverage of the base station (S102). The information can be the information broadcast by the base station 300. Alternatively, the information can be received from the base station 300 by the request of the terminal 100. The information can include one or more of the information on whether there exist any access points within the coverage of the base station that can be accessed by the terminal, the number of access points (APs), the address of each access point (e.g., MAC address or SSID (Service Set ID)) when there exist access points, the capability information for each access point (AP), and the information of the value of throughput available.

Upon receiving the information, the terminal 100 determines whether there exist any APs within the coverage of the base station based on the information received (S103).

When there exists AP within the coverage of the base station, the terminal 100 performs the search of AP with shorter period than the original search period of Px (S104). The reason search is performed with shorter period is that there are higher chances of discovering AP since there exists AP within the cell coverage of the base station. By performing the search with shorter period and accessing the AP promptly when the possibility of discovering AP is high as described above, the power consumption can be effectively managed. At this step, when it is determined that there exists AP within the cell coverage of the base station according to said information, the terminal 100 can search the AP with short period only when the QoS of the AP within the cell coverage of the base station is higher than the QoS of the base station to which the terminal is connected based on said information. By limiting the search of AP to the case where the QoS is high, the process of unnecessarily searching the AP with low QoS and accessing the AP based on the search can be saved. Alternatively, the search of APs within said cell coverage with lower QoS than the QoS of currently connected base station can be performed with the same period as the original period of search.

When AP is discovered by the search described above, it is determined whether to associate to the AP (S105). The determination of the association can be performed based on the throughput of the AP or the information on QoS ensured by the AP.

The terminal 100 accesses the AP based on the determination made above (S106). On the other hand, when AP is not discovered in the search of above step or no AP is available for association, the terminal performs cell reselection from the cell of the current base station to other cell or searches AP periodically until handover is made to other cell (S107). When the terminal performs cell reselection to another cell or handover to a neighboring cell, the terminal receives renewed information on one or more APs within the corresponding base station from the base station and repeats the processes described above.

Meanwhile, if no AP exists within the coverage of the base station in step S103, the terminal 100 runs predetermined Tx timer (S108), and after incrementing the searching period of the terminal by predetermined value ($\alpha$) upon expiration of the Tx timer, performs searching of access points with incremented period. Then the Tx timer is reset to 0 again, and the period of searching access point of the terminal is incremented by predetermined constant value every time the timer is expired.

AP is searched with predetermined period while the period of searching the access point of the terminal is below certain value (Pmax) (S109). The reason the search of the access point is performed with periods increasing gradually is that the possibility of discovering the AP within the cell coverage of the base station is reduced since there can be no AP in the cell coverage. However, there can be APs that are not known to the base station within the cell coverage of the base station or other APs installed by the user, and so it would be effective to do searches with extended periods rather than skipping the search.

If AP is discovered by the search while the period is not greater than the certain period value (Pmax), it is determined whether to associate to the AP discovered (S110)

If AP is not discovered by the search until the period reaches the certain period value (Pmax), the search of AP is stopped (S111). The search is stopped until cell reselection on the cellular cell or handover to a neighboring cellular cell occurs on the mobile communication terminal or until request for search on WLAN is made by the user (S112).

If the terminal performs a cell reselection from the cell of the current base station to another cell or a handover to neighboring cell, the terminal receives information on one or more APs located within the coverage of the corresponding cell of newly connected base station, and the above processes are repeated.

The methods of the present invention described above can be implemented by software or hardware, or by combination thereof. For example, the methods according to the present invention can be stored in storing media (e.g., internal memory, flash memory, hard disc, etc.) and can be implemented through the codes or commands in software program that can be executed by the processor (e.g. micro processor). This will be described with reference to FIG. 5.

Figure 5:
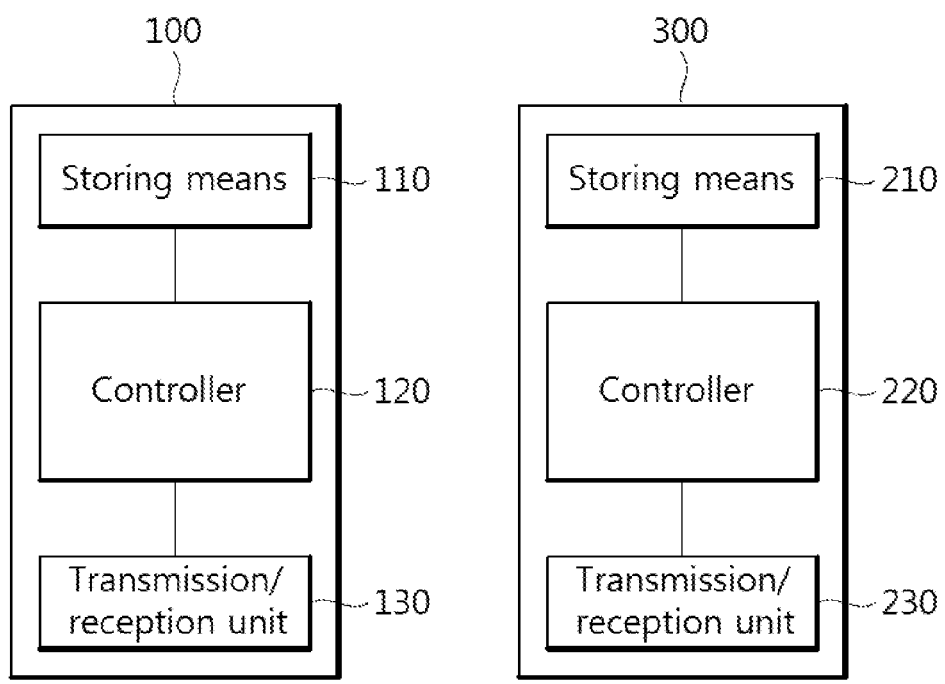
FIG. 5 is a block diagram of the terminal 100 and base station 300 according to the present invention.

FIG. 5 is a block diagram illustrating the construction of the terminal 100 and base station 300 of the present invention.

As illustrated in FIG. 5, the terminal 100 includes a storing means 110, a controller 120 and a transmission/reception unit 130. And the base station 300 includes a storing means 310, a controller 320 and a transmission/reception unit 330.

The storing means 110, 310 store the methods according to the embodiments 1-3 of the present invention illustrated in FIGS. 2-4.

The controllers 120, 320 control the storing means 110, 310 and the transmission/reception units 130, 330. More specifically, the controllers 120, 320 execute the method stored in the storing means 110, 310 respectively. And the controllers 120, 320 transmit the signals described above to the transmission/reception unit 130, 330.

The present invention can be implemented in specifically different forms within the scope of the idea and essential technical features of the present invention. Accordingly the description of the specification should be interpreted as illustrative rather than limiting the invention. The scope of the present invention should be determined through reasonable interpretation of the claims attached, and all modifications of the present invention in equivalent forms should be considered to be in the scope of the present invention. Also, new embodiments can be constructed by combinations of claims which are not dependent explicitly or new claims may be added by amendments after filing the application.

INDUSTRIAL APPLICABILITY

The present invention can be used to the handset, base station or other equipments of wireless mobile communication system.

The invention claimed is:

1. A method for searching access points performed by a terminal supporting a multi-RAT (Radio Access Technology) in a wireless communication system, the method comprising:
receiving, by the terminal, information on one or more access points (APs) located within a cell coverage of a base station, the information relating to an accessibility of each AP, a number of APs, an address of each AP, a capability of each AP, or a throughput value of each AP;
determining, by the terminal, whether there are any accessible APs within the cell coverage of the base station based on the received;
searching and selecting an AP within the cell coverage of the base station for an original time period, according to the determining,
wherein:
if it is determined that there are accessible APs within the cell coverage of the base station and a Quality of Service (QoS) of the accessible APs within the cell coverage is higher than a QoS of a base station to which the terminal is currently connected, the terminal searches and selects the AP among the accessible APs within a first time period, the first time period being shorter than the original time period for searching the AP,
if it is determined that there are accessible APs within the cell coverage of the base station and the Quality of Service (QoS) of the accessible APs within the cell coverage is lower than the QoS of the base station to which the terminal is currently connected, the terminal searches and selects the AP among the accessible APs with a second time period, the second time period being equal to the original time period for searching the AP,
if it is determined that there are no accessible APs within the cell coverage of the base station, the terminal searches and selects the AP within the cell coverage of the base station within a third time period,
the third time period is longer than the original time period for searching the AP, the third time period initially being shorter than a certain time period ($P_{max}$), and
the third time period is gradually increased until it reaches the certain time period (Pmax); and
accessing, by the terminal, the selected AP.

2. The method of claim 1, wherein:
a timer is running if it is determined that there is no accessible APs within the cell coverage of the base station; and
the terminal repeatedly searches and selects the AP within the cell coverage of the base station within the third time period upon an expiration of the timer.

3. The method of claim 2, wherein, if the terminal does not find the AP until the expiration of the timer, the searching and selecting are stopped until a cell reselection or a handover is performed.

4. The method of claim 1, wherein the accessing the selected AP is only performed if the throughput value of the selected AP has a higher value than the predetermined value.

5. A terminal for searching access points in wireless communication system, the terminal comprising:
a transmission or reception unit configured to receive information on one or more access points (APs) located within a cell coverage of a base station, the information relating to an accessibility of each AP, a number of APs, an address of each AP, a capability of each AP, or a throughput value of each AP; and
a controller configured to:
determine whether there are any accessible APs within the cell coverage of the base station based on the received information;
search and select an AP within the cell coverage of the base station for an original time period; and
access the selected AP,
wherein, if it is determined that there are accessible APs within the cell coverage of the base station and a Quality of Service (QoS) of the accessible APs within the cell coverage is higher than a QoS of a base station to which the terminal is currently connected, the terminal is further configured to search and select the AP among the accessible APs within a first time period,
wherein the first time period is shorter than the original time period for searching the AP,
wherein, if it is determined that there are accessible APs within the cell coverage of the base station and a Quality of Service (QoS) of the accessible APs within the cell coverage is lower than the QoS of the base station to which the terminal is currently connected, the terminal is further configured to search and select the AP among the accessible APs with a second time period,
wherein the second time period is equal to the original time period for searching the AP,
wherein, if it is determined that there are no accessible APs within the cell coverage of the base station, the terminal is further configured to search and select the AP within the cell coverage of the base station within a third time period,
wherein the third time period is longer than the original time period for searching the AP, the third time period initially being shorter than a certain time period ($P_{max}$), and
wherein the third time period is increased gradually until it reaches the certain time period ($P_{max}$).

6. The terminal device of claim 5, wherein:
a timer is configured to run if it is determined that there is no accessible APs within the cell coverage of the base station; and
the terminal is further configured to repeatedly search and select the AP within the cell coverage of the base station within the third time period upon an expiration of the timer.

7. The terminal device of claim 6, wherein if the terminal does not find the AP until the expiration of the timer, the searching and selecting are stopped until a cell reselection or a handover is performed.

8. The terminal device of claim 5, wherein the accessing the selected AP is only performed if the throughput value of the selected AP has a higher value than the predetermined value.

* * * * *